(12) United States Patent
Zhao et al.

(10) Patent No.: US 9,503,964 B2
(45) Date of Patent: *Nov. 22, 2016

(54) METHOD AND SYSTEM FOR PARALLEL TRANSMISSION OF PLURAL TYPES OF WIRELESS LINKS

(71) Applicant: HUIZHOU TCL MOBILE COMMUNICATION CO., LTD., Guangdong (CN)

(72) Inventors: Shiqing Zhao, Guangdong (CN); Baozhong Zhou, Guangdong (CN)

(73) Assignee: HUIZHOU TCL MOBILE COMMUNICATION CO., LTD, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/417,081

(22) PCT Filed: Apr. 22, 2014

(86) PCT No.: PCT/CN2014/075907
§ 371 (c)(1),
(2) Date: Jan. 23, 2015

(87) PCT Pub. No.: WO2015/062220
PCT Pub. Date: May 7, 2015

(65) Prior Publication Data
US 2015/0382279 A1 Dec. 31, 2015

(30) Foreign Application Priority Data
Nov. 4, 2013 (CN) .......................... 2013 1 0536507

(51) Int. Cl.
*H04W 40/34* (2009.01)
*H04L 12/64* (2006.01)
(Continued)

(52) U.S. Cl.
CPC ............ *H04W 40/34* (2013.01); *H04L 1/0003* (2013.01); *H04L 12/6418* (2013.01); *H04L 45/28* (2013.01); *H04W 24/08* (2013.01); *H04W 76/025* (2013.01)

(58) Field of Classification Search
CPC . H04L 12/6418; H04L 1/0003; H04L 45/28; H04W 24/08; H04W 40/34; H04W 76/025; H04Q 2213/036; H04Q 2213/13036
USPC .......................................................... 370/536
See application file for complete search history.

(56) References Cited

U.S. PATENT DOCUMENTS 8,428,038 B1 * 4/2013 Buttles .................... H04L 63/18
370/338
8,644,814 B2 * 2/2014 Quadri ................. H04W 24/04
455/11.1
(Continued)

FOREIGN PATENT DOCUMENTS

| CN | 101778114 | 7/2010 |
| CN | 102665142 | 9/2012 |

(Continued)

*Primary Examiner* — Warner Wong
(74) *Attorney, Agent, or Firm* — WPAT, P.C., Intellectual Property Attorneys; Anthony King

(57) ABSTRACT

A method and a system for a parallel transmission of plural types of wireless links are disclosed. The method includes: activating at least two different types of wireless links in advance; allocating transmission data to the wireless links at a signal source end according to transmission rates of the wireless links; and transmitting the allocated transmission data to the wireless links in parallel via the wireless links, so as to transmit the transmission data to a receiving end. In the method and the system, the data is transmitted via the plural wireless links in parallel, the transmission abilities of the wireless links are sufficiently utilized, and the transmission rate of the data is significantly increased. Since the wireless links are sufficiently utilized, a user's experience is enhanced.

17 Claims, 7 Drawing Sheets

(51) Int. Cl.
*H04L 1/00* (2006.01)
*H04L 12/703* (2013.01)
*H04W 24/08* (2009.01)
*H04W 76/02* (2009.01)

(56) References Cited

U.S. PATENT DOCUMENTS

| | | | | |
|---|---|---|---|---|
| 2005/0044250 A1* | 2/2005 | Gay | ............... | H04L 29/06 709/230 |
| 2005/0163093 A1* | 7/2005 | Garg | ............... | H04W 76/025 370/342 |
| 2007/0197256 A1* | 8/2007 | Lu | ............... | H04B 1/406 455/552.1 |
| 2008/0043716 A1* | 2/2008 | Toombs | ............... | H04L 45/00 370/351 |
| 2013/0309981 A1* | 11/2013 | Ngai | ............... | H04B 7/0404 455/78 |
| 2014/0086256 A1* | 3/2014 | Raniere | ............... | H04L 5/0001 370/401 |
| 2014/0269650 A1* | 9/2014 | Sahota | ............... | H04W 84/12 370/338 |
| 2015/0103816 A1* | 4/2015 | Nagara | ............... | H04W 76/023 370/343 |
| 2016/0020890 A1* | 1/2016 | Sirotkin | ............... | H04W 76/00 370/352 |

FOREIGN PATENT DOCUMENTS

| | | |
|---|---|---|
| CN | 102905319 | 1/2013 |
| CN | 103152382 | 6/2013 |
| CN | 103200606 | 7/2013 |
| CN | 103580842 | 2/2014 |

\* cited by examiner

METHOD AND SYSTEM FOR PARALLEL TRANSMISSION OF PLURAL TYPES OF WIRELESS LINKS

CROSS REFERENCE TO RELATED APPLICATION

This application claims the priority of Chinese Patent Application No.201310536507.4, filed on Nov. 4, 2013 in the SIPO (State Intellectual Property Office of the P.R.C). Further, this application is the National Phase application of International Application No. PCT/CN2014/075907 filed Apr. 22, 2014, which designates the United States and was published in Chinese. The entire disclosure of each of the above applications is incorporated herein by reference.

BACKGROUND OF THE INVENTION

1. Field of the Invention

The present invention generally relates to a field of high-speed data transmission, and more particularly to a method and a system for a parallel transmission of plural types of wireless links.

2. Description of Prior Art

Currently, modern communication technologies change rapidly, and the transmission rate of data is becoming faster and faster. A transmission rate of wireless communication is increasing step by step. Wireless communication entered the 4G era after the 2G and the 3G eras. Download speed of the 4G long term evolution (LTE) reaches 150 megabits per second (Mbps). Although the transmission rate of a wireless link is increasing, one user cannot utilize various types of wireless links to transmit data at the same time as the data is being transmitted. Accordingly, the wireless links are not sufficiently utilized, and the transmission rate of the data is not high.

SUMMARY OF THE INVENTION

Based on the deficiencies in the prior art, an object of the present invention is to provide a method and a system for a parallel transmission of plural types of wireless links aiming to solve the problems that the transmission rate of data is low, and the wireless links cannot be sufficiently utilized in the prior art.

A technical scheme of the present invention is as follows.

The present invention provides a method for a parallel transmission of plural types of wireless links, comprising:

Activating at least two different types of wireless links in advance;

Allocating transmission data to the wireless links at a signal source end according to transmission rates of the wireless links; and Transmitting the allocated transmission data to the wireless links in parallel via the wireless links, so as to transmit the transmission data to a receiving end.

When a fault occurs in one of the wireless links, the allocated transmission data corresponding to the one of the wireless links is re-allocated to another one of the wireless links with a highest transmission rate.

The transmission rates of the wireless links are acquired by the following steps of:

Transmitting identical detecting signals to the receiving end via the wireless links from the signal source end;

Transmitting the detecting signals to the signal source end via the wireless links after the receiving end receives the detecting signals;

Calculating durations for the detecting signals to be transmitted and received via the wireless links; and Calculating the transmission rates of the wireless links according to the durations and a size of the detecting signals.

In the method for the parallel transmission of the plural types of wireless links of the present invention, the step of allocating the transmission data to the wireless links at the signal source end according to the transmission rates of the wireless links comprises:

Acquiring a data size of each task of the transmission data when the transmission data is a multi-task data; and Allocating one of the tasks with a large data size to one of the wireless links with a high transmission rate, and allocating one of the tasks with a small data size to one of the wireless links with a low transmission rate.

The method for the parallel transmission of the plural types of wireless links of the present invention further comprises:

Splitting the task with the large data size, and the data size of each of the wireless links being proportional to the transmission rate of the said wireless link.

In the method for the parallel transmission of the plural types of wireless links of the present invention, the step of allocating the transmission data at the signal source end to the wireless links according to the transmission rates of the wireless links comprises:

Acquiring the transmission rates of the wireless links when the transmission data is a single-task data; and Splitting the transmission data to acquire a plurality of transmission data blocks according to a number of the wireless links and the transmission rates of the wireless links, wherein a number of the transmission data blocks corresponds to the number of the wireless links, and a size of each of the transmission data blocks corresponds to the transmission rate of the corresponding wireless link.

The method for the parallel transmission of the plural types of wireless links of the present invention further comprises:

Setting identifiers for the transmission data blocks for restoring the transmission data blocks into the transmission data.

In the method for the parallel transmission of the plural types of wireless links of the present invention, the wireless links are wireless links of fourth generation (4G) mobile communication technology, wireless links of third generation (3G) mobile communication technology, wireless link of wireless fidelity (Wi-Fi), or wireless links of Bluetooth.

The present invention further provides a method for a parallel transmission of plural types of wireless links, comprising:

Activating at least two different types of wireless links in advance;

Allocating transmission data to the wireless links at a signal source end according to transmission rates of the wireless links, wherein the data which is allocated to each of the wireless links at the signal source end is encrypted; and Transmitting the allocated transmission data to the wireless links in parallel via the wireless links, so as to transmit the transmission data to a receiving end.

In the method for the parallel transmission of the plural types of wireless links of the present invention, the step of allocating the transmission data to the wireless links at the signal source end according to the transmission rates of the wireless links comprises:

Acquiring a data size of each task of the transmission data when the transmission data is a multi-task data; and Allocating one of the tasks with a large data size to one of the wireless links with a high transmission rate, and allocating one of the tasks with a small data size to one of the wireless links with a low transmission rate.

The method for the parallel transmission of the plural types of wireless links of the present invention further comprises:

Splitting the task with the large data size, and the data size of each of the wireless links being proportional to the transmission rate of the said wireless link.

In the method for the parallel transmission of the plural types of wireless links of the present invention, the step of allocating the transmission data to the wireless links at the signal source end according to the transmission rates of the wireless links comprises:

Acquiring the transmission rates of the wireless links when the transmission data is a single-task data; and Splitting the transmission data to acquire a plurality of transmission data blocks according to a number of the wireless links and the transmission rates of the wireless links, wherein a number of the transmission data blocks corresponds to the number of the wireless links, and a size of each of the transmission data blocks corresponds to the transmission rate of the corresponding wireless link.

The method for the parallel transmission of the plural types of wireless links of the present invention further comprises:

Setting identifiers for the transmission data blocks for restoring the transmission data into the transmission data.

In the method for the parallel transmission of the plural types of wireless links of the present invention, the step of transmitting the allocated transmission data to the wireless links in parallel via the wireless links so as to transmit the transmission data to the receiving end comprises:

When a fault occurs in one of the wireless links, the allocated transmission data corresponding to the one of the wireless links is re-allocated to another one of the wireless links with a highest transmission rate.

In the method for the parallel transmission of the plural types of wireless links of the present invention, the transmission rates of the wireless links are acquired by the following steps of:

Transmitting identical detecting signals to the receiving end via the wireless links from the signal source end;

Transmitting the detecting signals to the signal source end via the wireless links after the receiving end receives the detecting signals;

Calculating durations for the detecting signals to be transmitted and received via the wireless links; and Calculating the transmission rates of the wireless links according to the durations and a size of the detecting signals.

The present invention further provides a system for a parallel transmission of plural types of wireless links, comprising:

An activating module for activating at least two different types of wireless links in advance;

A data allocating module for allocating transmission data to the wireless links at a signal source end according to transmission rates of the wireless links; and A transmitting module for transmitting the allocated transmission data to the wireless links in parallel via the wireless links, so as to transmit the transmission data to a receiving end.

In the system for the parallel transmission of the plural types of wireless links of the present invention, the data allocating module comprises:

A data amount acquiring unit for acquiring a data size of each task of the transmission data when the transmission data is a multi-task data; and A multi-task allocating unit for allocating one of the tasks with a large data size to one of the wireless links with a high transmission rate and allocating one of the tasks with a low data size to one of the wireless links with a low transmission rate.

In the system for the parallel transmission of the plural types of wireless links of the present invention, the multi-task allocating unit is further utilized for splitting the task with the large data size, and the data size of each of the wireless links is proportional to the transmission rate of the said wireless link.

In the system for the parallel transmission of the plural types of wireless links of the present invention, the data allocating module comprises:

A transmission rate acquiring unit for acquiring the transmission rates of the wireless links when the transmission data is a single-task data; and A single-task allocating unit for splitting the transmission data to acquire a plurality of transmission data blocks according to a number of the wireless links and the transmission rates of the wireless links, wherein a number of the transmission data blocks is the same as the number of the wireless links, and a size of each of the transmission data blocks corresponds to the transmission rate of the corresponding wireless link.

In the system for the parallel transmission of the plural types of wireless links of the present invention, the single-task allocating unit is further utilized for setting identifiers for the transmission data blocks for restoring the transmission data blocks into the transmission data.

In the system for the parallel transmission of the plural types of wireless links of the present invention, the transmitting module comprises:

A risk control unit for re-allocating the allocated transmission data corresponding to one of the wireless links to another one of the wireless links with a highest transmission rate when a fault occurs in the one of the wireless links.

In the system for the parallel transmission of the plural types of wireless links of the present invention, the data allocating module acquires the transmission rates of the wireless links by:

Transmitting identical detecting signals to the receiving end via the wireless links from the signal source end;

Transmitting the detecting signals to the signal source after the receiving end receives the detecting signals;

Calculating durations for the detecting signals to be transmitted and received via the wireless links; and Calculating the transmission rates of the wireless links according to the durations and a size of the detecting signals.

The beneficial effect of the present invention is that the data is transmitted via the plural wireless links in parallel, the transmission abilities of the wireless links are sufficiently utilized, and the transmission rate of the data is significantly increased. Since the wireless links are sufficiently utilized, a user's experience is enhanced.

DETAILED DESCRIPTION OF THE INVENTION

The present invention provides a method and a system for a parallel transmission of plural types of wireless links. In order to clarify the objectives, the technical schemes, and the advantages of the present invention, the description will be made as to the embodiments of the present invention in conjunction with the accompanying drawings. It should be understood that specific embodiments described herein are merely intended to explain the present invention, but are not intended to limit the present invention.

Figure 1:
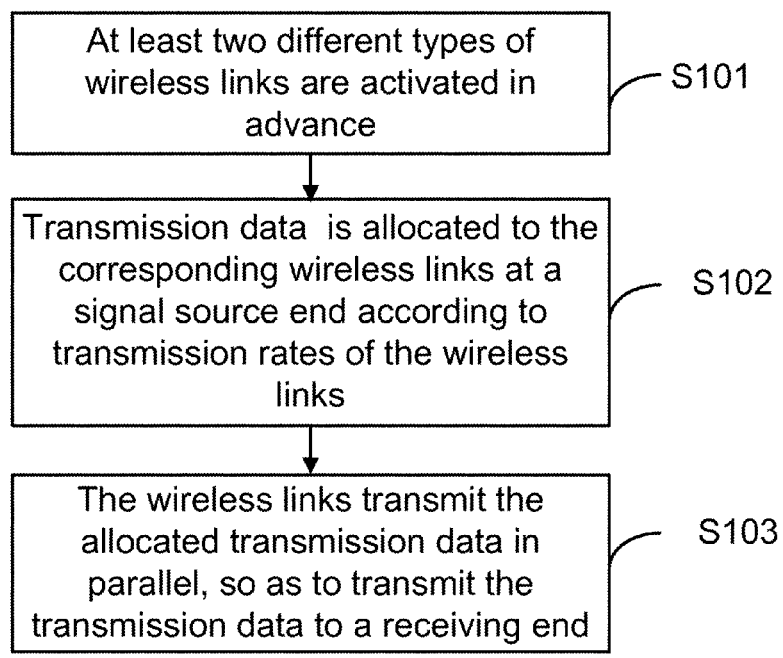
FIG. 1 is a flowchart of a method for a parallel transmission of plural types of wireless links in accordance with a preferred embodiment of the present invention.

Please refer to FIG. 1. FIG. 1 is a flowchart of a method for a parallel transmission of plural types of wireless links in accordance with a preferred embodiment of the present invention. As shown in FIG. 1, the method comprises the following steps.

In step S101, at least two different types of wireless links are activated in advance.

In step S102, transmission data is allocated to the corresponding wireless links at a signal source end according to transmission rates of the wireless links.

In step S103, the wireless links transmit the allocated transmission data in parallel, so as to transmit the transmission data to a receiving end.

Figure 2:
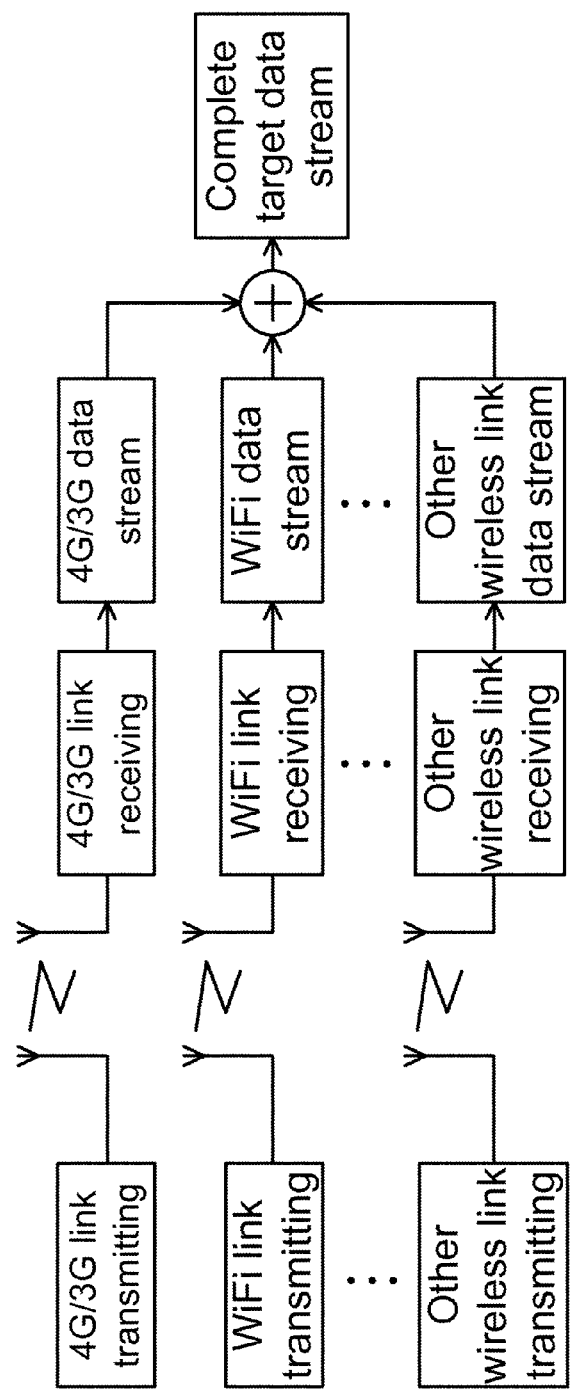
FIG. 2 is a flowchart of transmitting data via the wireless links in parallel in accordance with the present invention.

As shown in FIG. 2, the present invention adopts the plural types of wireless links to transmit the data in parallel, such that the data transmission ability of each of the wireless links can be sufficiently utilized. Data streams are restored into a complete target data stream at the receiving end, and thus the transmission rate of the data is significantly increased.

Specifically, the plural different types of wireless links are activated in step S101. In the present invention, each of the wireless links may be a commonly used wireless link, such as a wireless link of fourth generation (4G) or third generation (3G) mobile communication technology, a wireless link of wireless fidelity (Wi-Fi), a wireless link of Bluetooth, or other current wireless links. The present invention utilizes these wireless links to transmit the data in parallel, such that the data transmission abilities of the wireless links are sufficiently utilized, and the transmission rate of the data is significantly increased.

Figure 3:
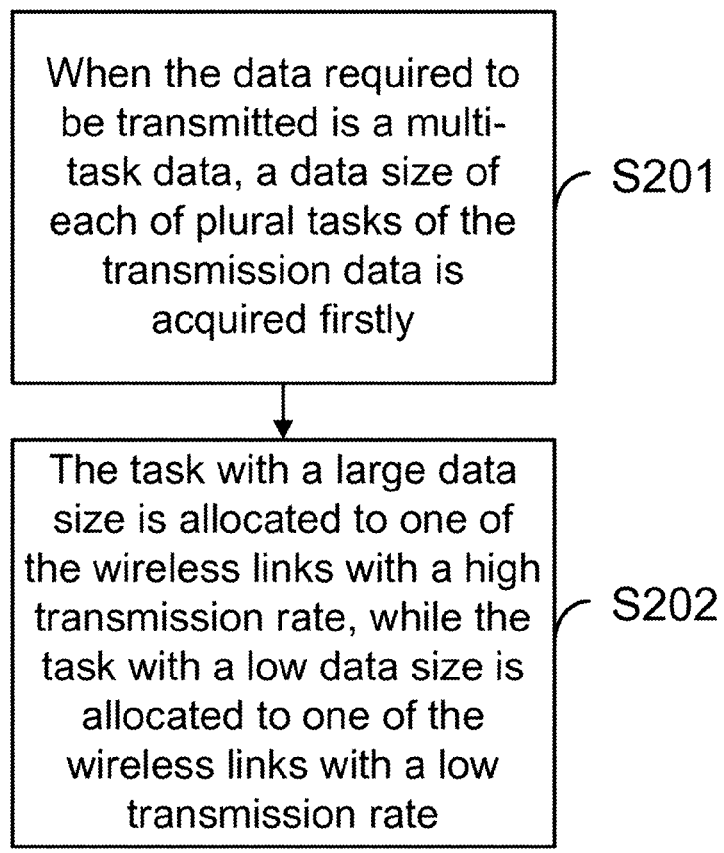
FIG. 3 is a specific flowchart of step S102 of the method in FIG. 1 in accordance with a preferred embodiment.

In step S102, the data is allocated, such that each of the wireless links acquires data which matches with the transmission ability per se. Specifically, as shown in FIG. 3, step S102 may comprise the following steps.

In step S201, when the data required to be transmitted (the transmission data) is a multi-task data, a data size of each of plural tasks of the transmission data is acquired firstly.

When the multi-task transmission is implemented, the transmission data may be allocated according to the data size of each of the tasks of the transmission data. Firstly, the data size of each of the tasks of the transmission data is required to be acquired.

In step S202, the task with a large data size is allocated to one of the wireless links with a high transmission rate, while the task with a low data size is allocated to one of the wireless links with a low transmission rate.

In the present step, the wireless link with the high transmission rate is utilized for transmitting the task with the large data size, and the wireless link with the low transmission rate is utilized for transmitting the task with the low data size. Certainly, when the number of the tasks is different from the number of the wireless links, the task with the large data size may be split, so as to properly allocate the data which is required to be transmitted by each of the wireless links. Accordingly, each of the wireless links can transmit the data, and the transmitted data size is proportional to the transmission rate per se.

Figure 4:
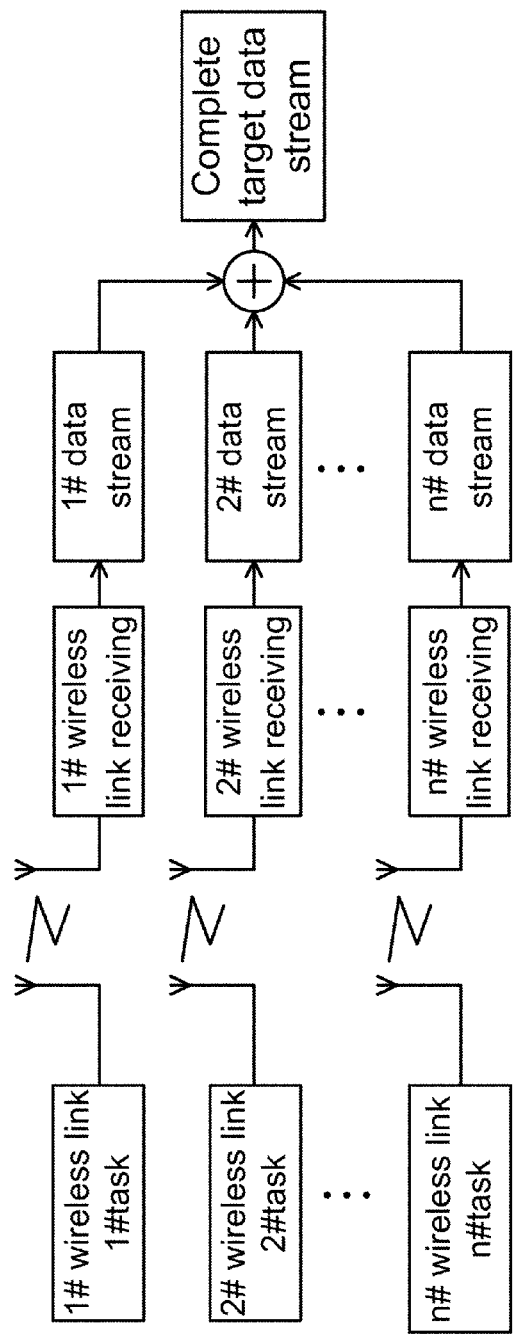
FIG. 4 is a flowchart of transmitting a multi-task data via the wireless links in parallel in accordance with the present invention.

For example, as shown in FIG. 4, there are n wireless links: 1# wireless link, 2# wireless link, ..., and n# wireless link. Transmission rates are as follows: 1# wireless link >2# wireless link > ... >n# wireless link. A number of tasks is n. Data sizes of the tasks are as follows: 1# task >2# task > ... >n# task. Then, the task with a large data size is allocated to one of the wireless links with a high transmission rate, while the task with a low data size is allocated to one of the wireless links with a low transmission rate. That is, 1# task is allocated to 1# wireless link. 2# task is allocated to 2# wireless link. n# task is allocated to n# wireless link. Each of the wireless links has a different task and independently transmits the data. A receiving end normalizes each of the received tasks to generate a complete target data stream of the receiving end, and then corresponding displaying and storing processes are performed.

Figure 5:
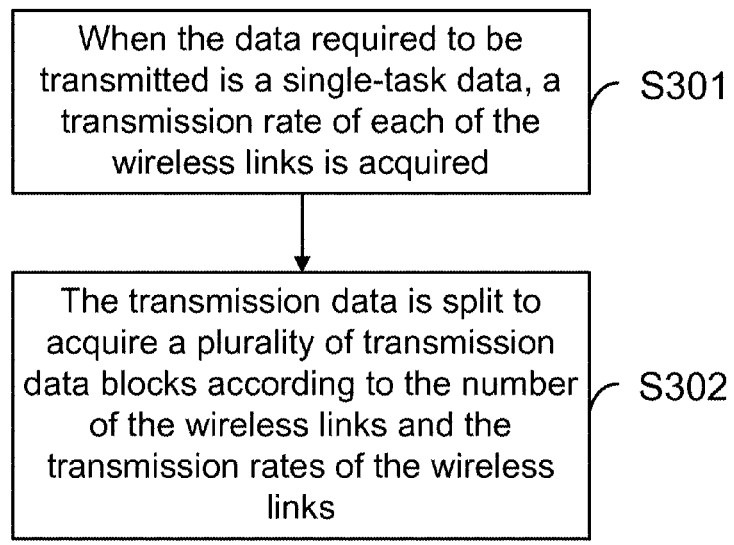
FIG. 5 is a specific flowchart of step S102 of the method in FIG. 1 in accordance with another preferred embodiment.

Furthermore, as shown in FIG. 5, step S102 further comprises the following steps for a single-task data transmission.

In step S301, when the data required to be transmitted is a single-task data, a transmission rate of each of the wireless links is acquired. In the present step, the transmission rate of each of the wireless links is required to be acquired, so as to split the task in the following step.

In step S302, the transmission data is split to acquire a plurality of transmission data blocks according to the number of the wireless links and the transmission rates of the wireless links. The number of the transmission data blocks is the same as the number of the wireless links, and the size of each of the transmission data blocks corresponds to the transmission rate of the corresponding wireless link.

Figure 6:
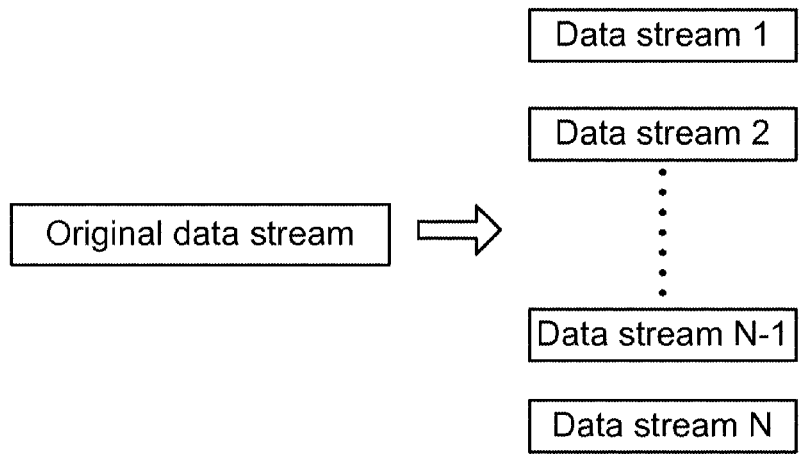
FIG. 6 is a flowchart of splitting data at a signal source end in the method of the present invention.
Figure 7:
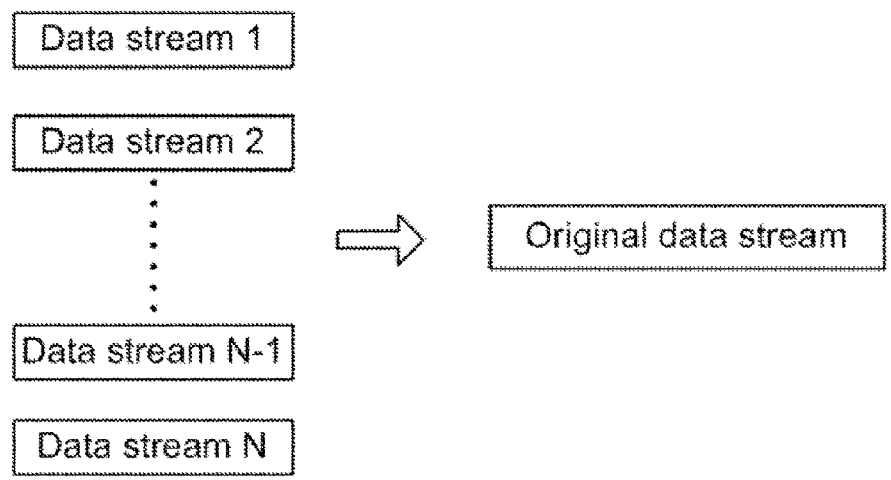
FIG. 7 is a flowchart of restoring data at a receiving end in the method of the present invention.

In the present step, the transmission data can be split according to the number and the transmission rates of the wireless links, such that the number of split transmission data blocks is the same as the number of the wireless links, and the size of each of the transmission data blocks matches with the transmission rate of the corresponding wireless link. That is, the size of each of the transmission data blocks is proportional to the transmission rate of the corresponding wireless link. For example, there are n wireless links. The transmission rate of a first wireless link is R1 the transmission rate of a second wireless link is R2, ..., and the transmission rate of an n-th wireless link is Rn. Then, the number of the split transmission data blocks of the single-task data is n. A first data block corresponds to the first wireless link, and the size is R1/(R1+R2+ ... +Rn). A second data block corresponds to the second wireless link, and the size is R2/(R1+R2+ . . . +Rn). An n-th data block corresponds to the n-th wireless link, and the size is Rn/(R1+R2+ . . . +Rn). As shown in FIG. 6 and FIG. 7, an original data stream is split into n data streams at a signal source end. After a receiving end receives the data streams, the data streams are connected based on a sequence of the original data stream, so as to be restored into the original data stream.

According to the above-mentioned principle, the data blocks can be allocated to corresponding wireless transmission channels for implementing the data transmission, and the wireless links transmit respective data blocks at the same time. After the receiving end receives the transmission data blocks from each of the wireless links, the transmission data blocks are connected based on the sequence, so as to be restored into the original data. As a result, the data transmission abilities of the plural wireless links are utilized for significantly increasing the transmission rate of the data and meeting the requirement for transmitting the data with a high transmission rate.

Furthermore, when the single-task transmission is implemented and the data is split, it is required to set identifiers to the transmission data blocks. The data is sequentially split according to the identifiers. When the receiving end receives each of the transmission data blocks, the transmission data blocks are sequentially connected according to the identifiers and restored into the original data.

In the present embodiment, a risk control function is further provided. That is, step S103 further comprises the following step.

When a fault occurs in one of the wireless links, the transmission data corresponding to the one of the wireless links is re-allocated to another one of the wireless links with a highest transmission rate and then transmitted. That is, when a fault or a congestion occurs in one of the wireless links, the data required to be transmitted is transmitted via another one of the wireless links. A preferable principle for selecting the wireless link is to select a wireless link with the highest transmission rate, such that resources are utilized to the greatest extent.

For example, in the transmission links in FIG. 4, the data transmission rate of 1# wireless link is highest, the data transmission rate of 2# wireless link is second, and so forth. The data transmission rate of n# wireless link is lowest. When a fault or a congestion occurs in 1# wireless link, the data is transmitted via the wireless link with the highest data transmission rate excluding 1# wireless link instead of via 1# wireless link. That is, the data is transmitted via 2# wireless link. When a fault or a congestion occurs in m# (m is not equal to 1) wireless link, the data is transmitted via the wireless link with the highest data transmission rate excluding m# wireless link instead of via m# wireless link. That is, the data is transmitted via 1# wireless link. That is, the data is transmitted via 1# wireless link. The data is transmitted via the wireless link with the highest data transmission rate excluding 1# and m# wireless links when another fault occurs in 1# wireless link, either.

In the present embodiment, the transmission rates of the wireless links are acquired according to the following steps.

The signal source end transmits detecting signals with the same size to the receiving end via the wireless links.

The receiving end returns the detecting signals to the signal source end after receiving the detecting signals.

Required durations for the detecting signals to be transmitted and received via the wireless links are calculated.

The transmission rates of the wireless links are calculated according to the required durations and the size of the detecting signals.

The transmission rates are calculated as:

$$K=B/t.$$

K is the transmission rate of a wireless link. B is a bit number of the transmission data. t is the required duration for transmitting the transmission data.

Furthermore, the data which is allocated to each of the wireless links at the signal source end may be encrypted during the transmission of the data. The receiving end decrypts the data which is received from each of the wireless links according to a consistent protocol, and then the data is restored with an original format, thereby increasing the security of the data transmission.

Figure 8:
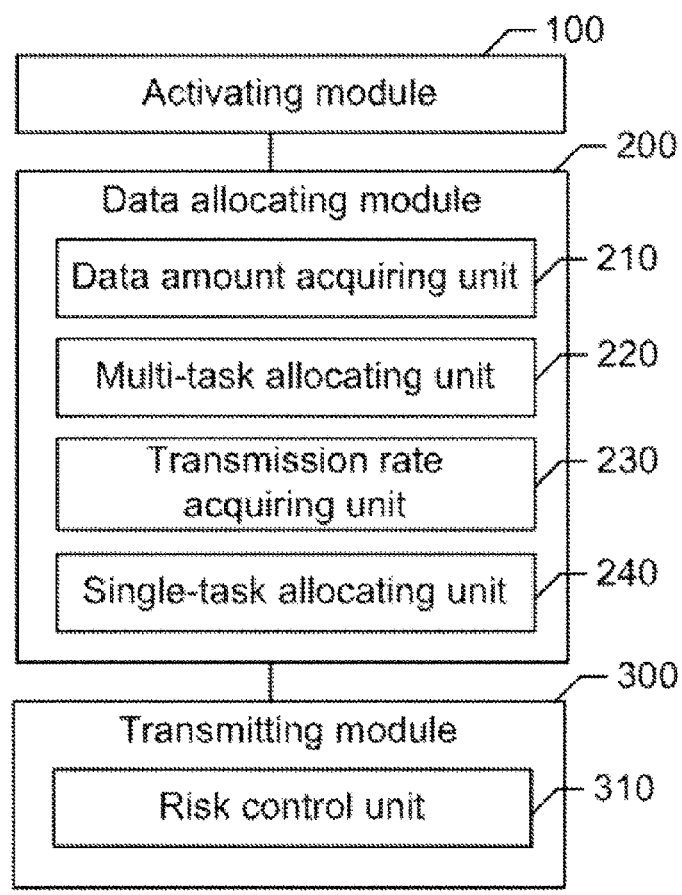
FIG. 8 is a block diagram of a system for a parallel transmission of plural types of wireless links of the present invention including a block diagram of a data allocating module and a block diagram of a transmitting module.

Based on the above-mentioned method, the present invention further provides a system for a parallel transmission of plural types of wireless links. As shown in FIG. 8, the system comprises:

An activating module 100 for activating the plural types of wireless links in advance;

A data allocating module 200 for allocating transmission data to each of the wireless links at a signal source end according to transmissions rates of the wireless links; and A transmitting module 300 for transmitting the allocated transmission data in parallel, so as to transmit the allocated transmission data to a receiving end.

Furthermore, the data allocating module 200 comprises:

A data amount acquiring unit 210 for acquiring a data size of each task of the transmission data when the transmission data is a multi-task data; and A multi-task allocating unit 220 for allocating one of the tasks with a large data size to one of the wireless links with a high transmission rate and allocating one of the tasks with a low data size to one of the wireless links with a low transmission rate.

Furthermore, the data allocating module 200 comprises:

A transmission rate acquiring unit for acquiring the transmission rates of the wireless links when the transmission data is a single-task data; and A single-task allocating unit 240 for splitting the transmission data to acquire a plurality of transmission data blocks according to a number of the wireless links and the transmission rates of the wireless links, wherein a number of the transmission data blocks is the same as the number of the wireless links, and a size of each of the transmission data blocks corresponds to the transmission rate of the corresponding wireless link.

Furthermore, the transmission module 300 comprises:

A risk control unit 310 for re-allocating the transmission data corresponding to one of the wireless links to another one of the wireless links with a highest transmission rate and then transmitting when a fault occurs in the one of the wireless links.

Furthermore, the data allocating module 200 acquires the transmission rates of the wireless links with the following steps:

Transmitting detecting signals with the same size to a receiving end via the wireless links from a signal source end;

Returning the detecting signals to the signal source end after the receiving end receives the detecting signals;

Calculating required durations for the detecting signals to be received and returned via each of the wireless links; and Calculating transmission rates of the wireless links according to the required durations and the size of the detecting signals.

The transmission rates are calculated as:

$$K = B/t.$$

K is the transmission rate of a wireless link. B is a bit number of the transmission data. t is the required duration for transmitting the transmission data.

Furthermore, the data which is allocated to each of the wireless links at the signal source end may be encrypted during the transmission of the data. The receiving end decrypts the data which is received from each of the wireless links according to a consistent protocol, and then the data is restored with an original format, thereby increasing the security of the data transmission.

As is understood by a person skilled in the art, the foregoing preferred embodiments of the present invention are illustrative rather than limiting of the present invention. It is intended that various modifications and similar arrangements are to be included within the spirit and scope of the appended claims, the scope of which should be accorded the broadest interpretation so as to encompass all such modifications and similar structures.

What is claimed is:

1. A method for a parallel transmission of plural types of wireless links, comprising:
    activating at least two different types of wireless links in advance;
    allocating transmission data to the wireless links at a signal source end according to transmission rates of the wireless links; and
    transmitting the allocated transmission data to the wireless links in parallel via the wireless links, so as to transmit the transmission data to a receiving end,
    wherein when a fault occurs in one of the wireless links, the allocated transmission data corresponding to the one of the wireless links is re-allocated to another one of the wireless link with a highest transmission rate,
    wherein the transmission rates of the wireless links are acquired by the following steps of:
    transmitting identical detecting signals to the receiving end via the wireless links from the signal source end;
    transmitting the detecting signals to the signal source end via the wireless links after the receiving end receives the detecting signals;
    calculating durations for the detecting signals to be transmitted and received via the wireless links; and
    calculating the transmission rates of the wireless links according to the durations and a size of the detecting signals,
    wherein the step of allocating the transmission data to the wireless links at the signal source end according to the transmission rates of the wireless links comprises:
    acquiring a data size of each task of the transmission data when the transmission data is a multi-task data; and
    allocating one of the tasks with a large data size to one of the wireless links with a high transmission rate, and allocating one of the tasks with a small data size to one of the wireless links with a low transmission rate.

2. The method for the parallel transmission of the plural types of wireless links of claim 1, further comprising:
    splitting the task with the large data size, and the data size of each of the wireless links being proportional to the transmission rate of the said wireless link.

3. The method for the parallel transmission of the plural types of wireless links of claim 1, wherein the step of allocating the transmission data to the wireless links at the signal source end according to the transmission rates of the wireless links comprises:
    acquiring the transmission rates of the wireless links when the transmission data is a single-task data; and
    splitting the transmission data to acquire a plurality of transmission data blocks according to a number of the wireless links and the transmission rates of the wireless links, wherein a number of the transmission data blocks corresponds to the number of the wireless links, and a size of each of the transmission data blocks corresponds to the transmission rate of the corresponding wireless link.

4. The method for the parallel transmission of the plural types of wireless links of claim 3, further comprising:
    setting identifiers for the transmission data blocks for restoring the transmission data blocks into the transmission data.

5. The method for the parallel transmission of the plural types of wireless links of claim 1, wherein the wireless links are wireless links of fourth generation (4G) mobile communication technology, wireless links of third generation (3G) mobile communication technology, wireless link of wireless fidelity (Wi-Fi), or wireless links of Bluetooth.

6. A method for a parallel transmission of plural types of wireless links, comprising:
    activating at least two different types of wireless links in advance;
    allocating transmission data to the wireless links at a signal source end according to transmission rates of the wireless links, wherein the data which is allocated to each of the wireless links at the signal source end is encrypted; and
    transmitting the allocated transmission data to the wireless links in parallel via the wireless links, so as to transmit the transmission data to a receiving end,
    wherein the step of allocating the transmission data to the wireless links at the signal source end according to the transmission rates of the wireless links comprises:
    acquiring a data size of each task of the transmission data when the transmission data is a multi-task data; and
    allocating one of the tasks with a large data size to one of the wireless links with a high transmission rate, and allocating one of the tasks with a small data size to one of the wireless links with a low transmission rate.

7. The method for the parallel transmission of the plural types of wireless links of claim 6, further comprising:
    splitting the task with the large data size, and the data size of each of the wireless links being proportional to the transmission rate of the said wireless link.

8. The method for the parallel transmission of the plural types of wireless links of claim 6, wherein the step of allocating the transmission data to the wireless links at the signal source end according to the transmission rates of the wireless links comprises:
    acquiring the transmission rates of the wireless links when the transmission data is a single-task data; and
    splitting the transmission data to acquire a plurality of transmission data blocks according to a number of the wireless links and the transmission rates of the wireless links, wherein a number of the transmission data blocks corresponds to the number of the wireless links, and a size of each of the transmission data blocks corresponds to the transmission rate of the corresponding wireless link.

9. The method for the parallel transmission of the plural types of wireless links of claim 8, further comprising:
    setting identifiers for the transmission data blocks for restoring the transmission data blocks into the transmission data.

10. The method for the parallel transmission of the plural types of wireless links of claim 6, wherein the step of transmitting the allocated transmission data to the wireless links in parallel via the wireless links, so as to transmit the transmission data to the receiving end comprises:
when a fault occurs in one of the wireless links, the allocated transmission data corresponding to the one of the wireless links is re-allocated to another one of the wireless links with a highest transmission rate.

11. The method for the parallel transmission of the plural types of wireless links of claim 6, wherein the transmission rates of the wireless links are acquired by the following steps of:
transmitting identical detecting signals to the receiving end via the wireless links from the signal source end;
transmitting the detecting signals to the signal source end via the wireless links after the receiving end receives the detecting signals;
calculating durations for the detecting signals to be transmitted and received via the wireless links; and
calculating the transmission rates of the wireless links according to the durations and a size of the detecting signals.

12. A system for a parallel transmission of plural types of wireless links, comprising:
one or more processors; and
a memory connected with the one or more processors, the memory comprising a plurality of program instructions executable by the one or more processors, the program instructions comprising:
an activating module configured to cause the one or more processors to activate at least two different types of wireless links in advance;
a data allocating module configured to cause the one or more processors to allocate transmission data to the wireless links at a signal source end according to transmission rates of the wireless links; and
a transmitting module configured to cause the one or more processors to transmit the allocated transmission data to the wireless links in parallel via the wireless links, so as to transmit the transmission data to a receiving end,
wherein the data allocating module comprises:
a data amount acquiring unit configured to cause the one or more processors to acquire a data size of each task of the transmission data when the transmission data is a multi-task data; and
a multi-task allocating unit configured to cause the one or more processors to allocate one of the tasks with a large data size to one of the wireless links with a high transmission rate and to allocate one of the tasks with a low data size to one of the wireless links with a low transmission rate.

13. The system for the parallel transmission of the plural types of wireless links of claim 12, wherein the multi-task allocating unit is further configured to cause the one or more processors to split the task with the large data size, and the data size of each of the wireless links is proportional to the transmission rate of the said wireless link.

14. The system for the parallel transmission of the plural types of wireless links of claim 12, wherein the data allocating module comprises:
a transmission rate acquiring unit configured to cause the one or more processors to acquire the transmission rates of the wireless links when the transmission data is a single-task data; and
a single-task allocating unit configured to cause the one or more processors to split the transmission data to acquire a plurality of transmission data blocks according to a number of the wireless links and the transmission rates of the wireless links, wherein a number of the transmission data blocks is the same as the number of the wireless links, and a size of each of the transmission data blocks corresponds to the transmission rate of the corresponding wireless link.

15. The system for the parallel transmission of the plural types of wireless links of claim 14, wherein the single-task allocating unit is further configured to cause the one or more processors to set identifiers for the transmission data blocks for restoring the transmission data blocks into the transmission data.

16. The system for the parallel transmission of the plural types of wireless links of claim 12, wherein the transmitting module comprises a risk control unit configured to cause the one or more processors to re-allocate the allocated transmission data corresponding to one of the wireless links to another one of the wireless links with a highest transmission rate when a fault occurs in the one of the wireless links.

17. The system for the parallel transmission of the plural types of wireless links of claim 12, wherein the data allocating module is configured to cause the one or more processors to acquire the transmission rates of the wireless links by transmitting identical detecting signals to the receiving end via the wireless links from the signal source end, transmitting the detecting signals to the signal source end after the receiving end receiving the detecting signals, calculating durations for the detecting signals to be transmitted and received via the wireless links, and calculating the transmission rates of the wireless links according to the durations and a size of the detecting signals.

* * * * *